Patented Dec. 7, 1943

2,336,445

UNITED STATES PATENT OFFICE 2,336,445

4-SUBSTITUTED-2'-SUBSTITUTED DIPHENYL SULPHONE

James H. Williams, Riverside, Conn., assignor to American Cyanamid Company, New York, N. Y., a corporation of Maine No Drawing. Application February 12, 1941, Serial No. 378,565

3 Claims. (Cl. 260—397.6)

This invention relates to a new class of chemical compounds and methods for their preparation. More particularly it relates to the compounds represented by the following general formula:

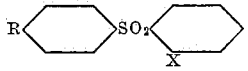

in which R represents an amino radical or a radical convertible into an amino group, such as an acylamino radical, and X represents a nitro or amino radical.

These compounds are useful as intermediates for the production of azo dyes and pharmaceuticals. Some of the compounds may be useful as chemotherapeutic agents themselves since it is known that some sulphones do have bacteriostatic properties.

The methods for preparation of the compounds of this invention will be specifically illustrated in the following examples. It should be understood, however, that the examples are merely illustrative of the preferred method of preparing representative compounds of the class and they are not intended to limit the scope of the invention.

The parts are by weight except in the case of liquids which are expressed in corresponding parts by volume.

Example 1

Thirty-five parts of p-acetylaminobenzene sulphinic acid was added to 27 parts of o-nitrobrombenzene and 22.4 parts of potassium acetate in 250 parts of ethyl ether of ethylene glycol, and the reaction mixture was heated to reflux. After refluxing for about five hours, the reaction mixture was cooled and the precipitate of p-acetylamino-o'-nitrodiphenylsulphone which has formed was filtered off. The product weighed 35 parts.

In the above example the p-acetylaminobenzene sulphinic acid can be replaced by other p-acylaminobenzene sulphinic acids, such as p-butyryl, p-benzoyl, p-nicotinyl, p-valeryl, p-caproyl aminobenzene sulphinic acids and the like, to give a number of related compounds. The acetyl compound is generally employed if the product is to be ultimately subjected to a hydrolysis step to convert the acylamino group to an amino group as the acetylated compounds are more readily available and hence the cheapest. However, in other cases where the acylated sulphanilyl compound is to be used as such and not subjected to a hydrolysis step in subsequent reaction, it may be desirable to use some other acylated compound as the reactant in place of p-acetylaminobenzene sulphinic acid, the selection depending upon the particular use to which the product is to be put.

The process of Example 1 was carried out in the presence of potassium acetate and the ethyl ether of ethylene glycol. It is possible, however, to replace the potassium acetate with potassium hydroxide, sodium hydroxide, or other alkali metal salts and the ethyl ether of ethylene glycol with other organic solvents. For example, sodium acetate or potassium hydroxide may be employed and for the organic liquid any other suitable solvent such as dioxane, the various alcohols, such as methyl, ethyl, propyl, isopropyl, and the like, may be employed. In some cases it may be desirable to use an organic medium which, in itself, is slightly alkaline, such as pyridine or quinoline, to effectively neutralize the hydrogen halide split off in the reaction. The alkali metal salts of the p-acylaminobenzene sulphinic acids may be prepared and isolated, if desired, prior to the reaction with the o-nitrobromobenzene.

The invention, moreover, is not intended to be limited to the use of o-nitrobromobenzene, and the o-nitrochlorobenzene, o-nitrofluorobenzene, or o-nitroidobenzene compounds may be employed.

Example 2

Fifty parts of the product obtained according to Example 1 above was placed in a round-bottom flask with 1500 parts of water acidified with 0.5 part of glacial acetic acid. The reaction mixture was heated, with stirring, on a steam bath, and 130 parts of iron dust was added slowly. By the time the temperature had risen to 55° C. (one hour) the iron dust had all been added. The reaction mixture was then heated to 80° C. and allowed to run at this temperature for about 25 hours. When the reaction was completed the reaction mixture was cooled, neutralized with sodium carbonate, and filtered. The filter cake thus obtained was extracted with hot 95% ethanol from which the p-acetylamino-o'-aminodiphenylsulphone separated on cooling in the form of white crystals. The product was recrystallized from a mixture of dioxane and water using a small amount of sodium bisulphite to remove traces of color. The final product had a melting point of 236° C.

The p-acetylamino-o'-nitrodiphenyl sulphone is reduced to the corresponding amino compound very readily by the process described in Example 2. However, it is not intended to limit the invention to the particular method of reduction and other procedures well known in the art may be employed.

*Example 3*

Fourteen parts of the acetyl compound of Example 2 was refluxed for one hour in 75 parts, 1:1 concentrated HCl-water solution. At the end of this time the reaction mixture was cooled and the precipitate which separated was filtered off. The hydrochloride thus obtained was suspended in water and sodium hydroxide added to neutralize the acid. The free base 4-amino-2-aminodiphenylsulphone was separated and washed with water and then crystallized from absolute ethyl alcohol. The final product melted at 117° C. uncorrected.

The amino compound produced in accordance with Example 3 may be diazotized and coupled with known coupling reagents to produce valuable azo dyestuffs. Similarly the compound may be employed for the preparation of the Schiff base type of compounds. The amino compound is basic and readily forms salts with acids, such as for example with hydrochloric acid to give the hydrochloride.

In this example, the p-acetylamino compound was used in carrying out the reaction. It should be understood, however, that any of the p-acyl- amino compounds mentioned heretofore in the specification may be employed for carrying out the reaction. The acetyl compound is preferred, however, because of its availability and cheapness.

The above description and examples are intended to be illustrative only and any modification of or variation therefrom which conforms with the spirit of the invention is intended to be included in the scope of the claims.

What I claim is:

1. The compound having the following formula:

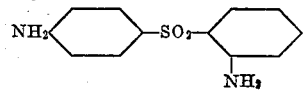

2. The process of preparing 4-amino-2'-aminodiphenyl sulphone which comprises hydrolyzing 4-acetylamino-2'-aminodiphenyl sulphone.

3. The process of preparing 4-amino-2'-amino diphenyl sulphone which comprises the steps of reacting a p-monocarboxylic acylamino benzene sulphinic acid with o-nitrohalobenzene to give p-monocarboxylic acylamino-o'-nitro diphenyl sulphone, reducing the nitro group to give p-monocarboxylic acylamino-o'-amino diphenyl sulphone, and hydrolyzing said p-acyl compound to give 4-amino-2'-amino diphenyl sulphone.

JAMES H. WILLIAMS.